March 26, 1940.  T. J. FEGLEY ET AL  2,195,363
ICE CRUSHER
Filed Oct. 15, 1937  3 Sheets-Sheet 2
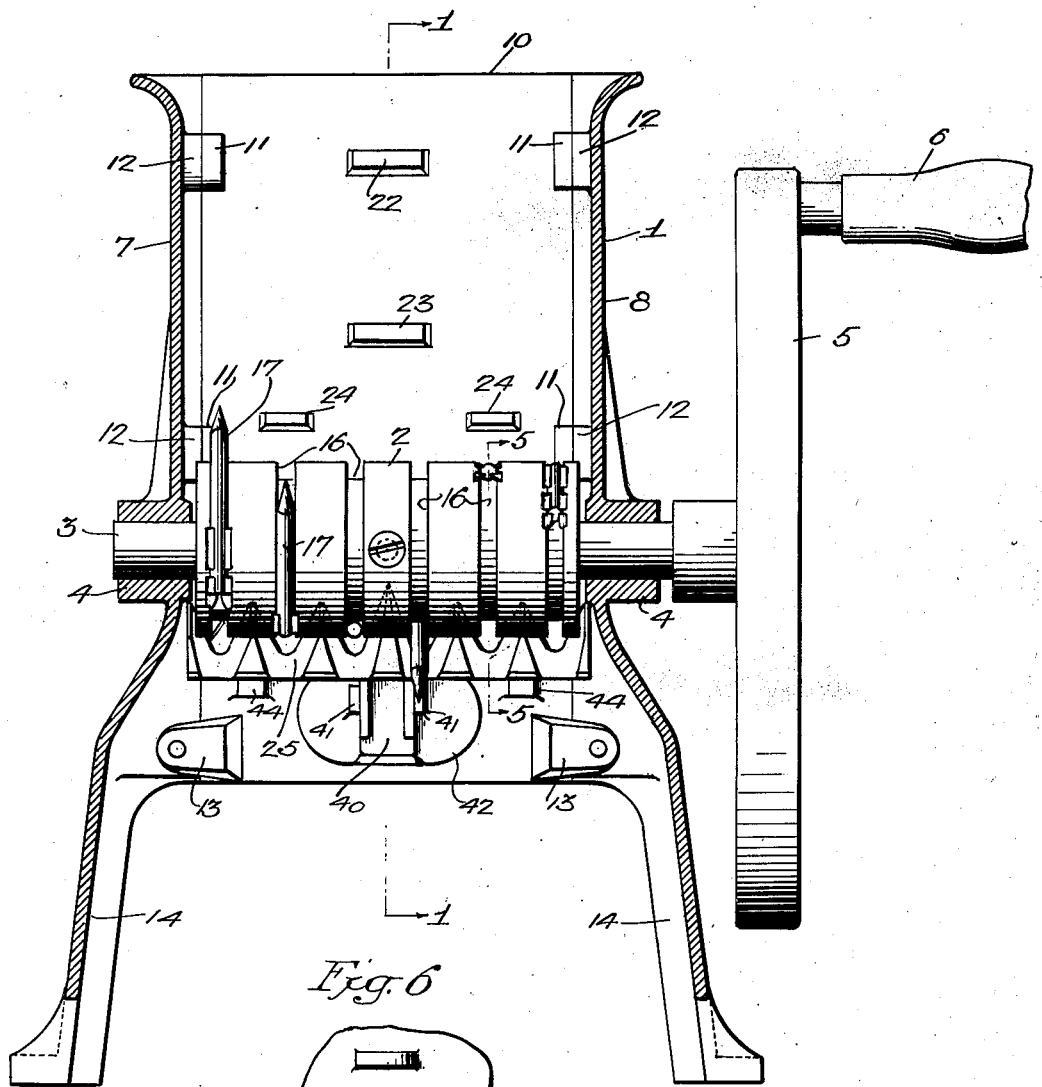
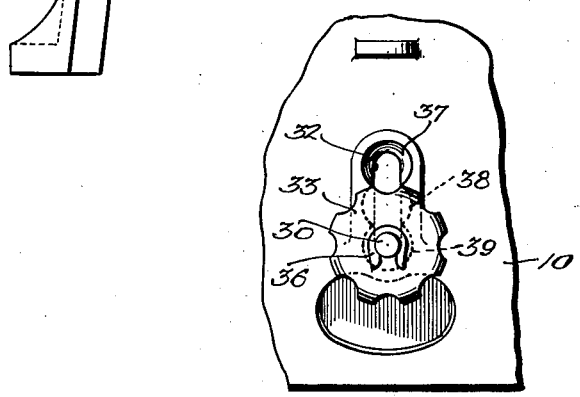
Inventors
Thomas J. Fegley
George O. Leopold
by their Attorneys
Howson & Howson March 26, 1940.  T. J. FEGLEY ET AL  2,195,363
ICE CRUSHER
Filed Oct. 15, 1937  3 Sheets-Sheet 3
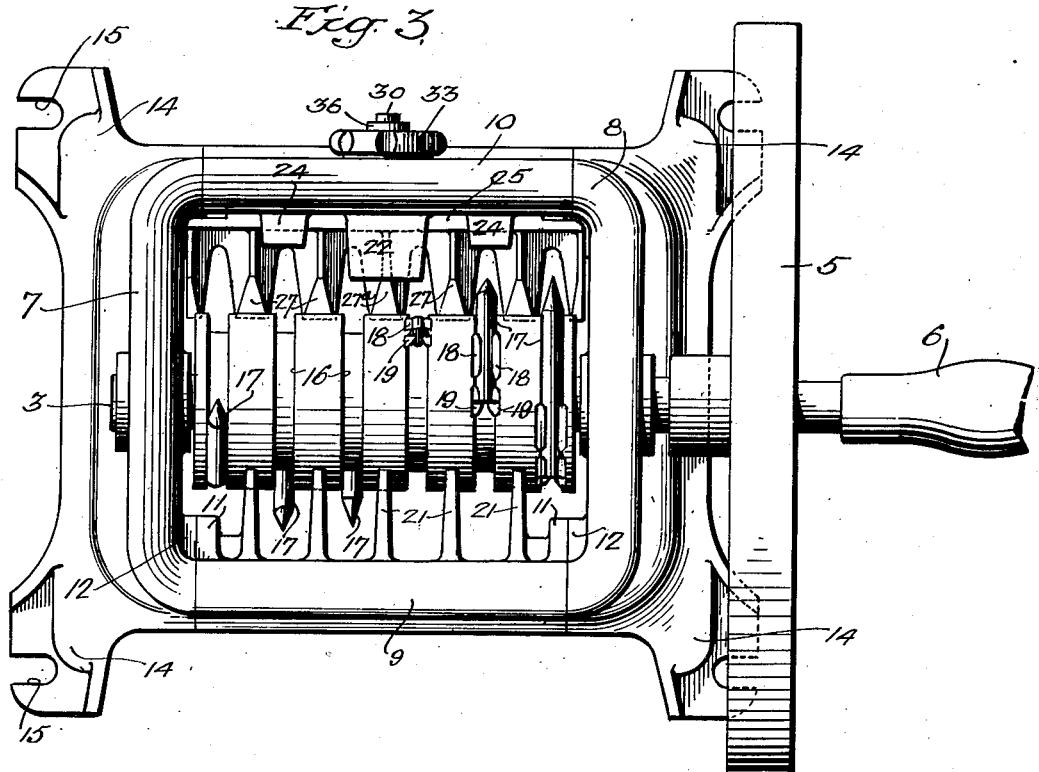
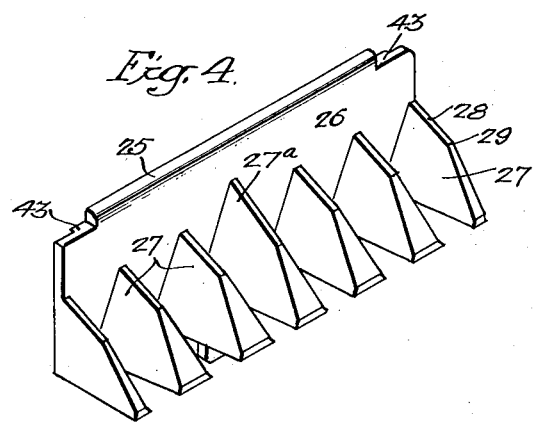
Inventors.
Thomas J. Fegley
George O. Leopold
by their Attorneys.
Howson & Howson Patented Mar. 26, 1940

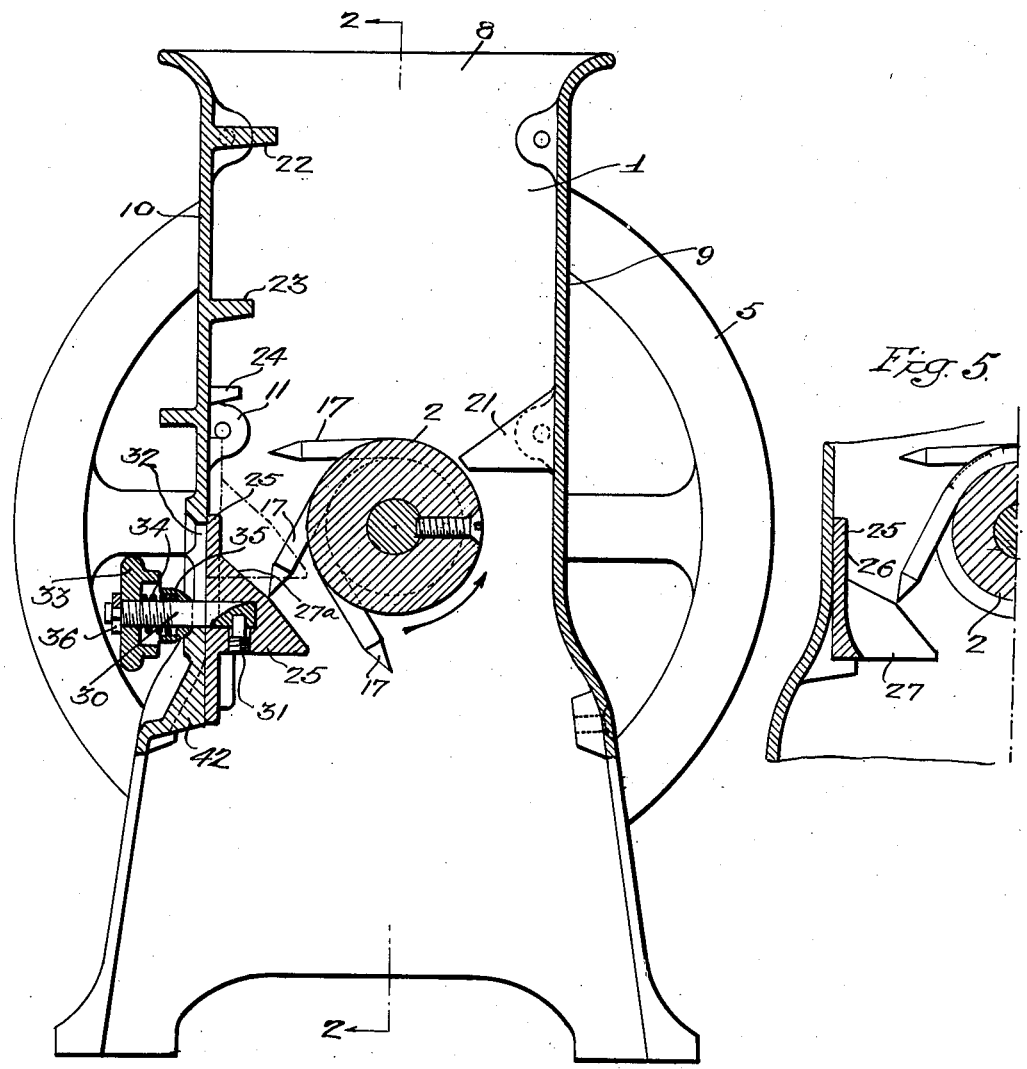

2,195,363

UNITED STATES PATENT OFFICE 2,195,363

ICE CRUSHER

Thomas J. Fegley, Jenkintown, and George O. Leopold, Philadelphia, Pa., assignors to North Bro's M'f'g Co., Philadelphia, Pa., a corporation of Pennsylvania Application October 15, 1937, Serial No. 169,298

3 Claims. (Cl. 83—63)

This invention relates to ice crushers of the rotary toothed cylinder type, and a principal object of the invention is to provide a crusher of this class that shall be characterized by relative simplicity of form and manufacture, and high operating efficiency.

A more specific object of the invention is to provide novel and simplified means for adjusting the device to deliver different sizes of crushed ice particles.

The invention further resides in the various structural details and arrangements hereinafter described and illustrated in the attached drawings, in which:

Figure 1 is a vertical sectional view on the line 1—1, Fig. 2;

Fig. 2 is a vertical sectional view on the line 2—2, Fig. 1;

Fig. 3 is a top plan view of the crusher;

Fig. 4 is a view in perspective of the adjustable comb element;

Fig. 5 is a fragmentary sectional view on the line 5—5, Fig. 2, illustrating a detail of the comb construction, and Fig. 6 is a fragmentary elevational view illustrating details of the comb-adjusting and -retaining means.

With reference to the drawings, the device therein illustrated comprises an open-top casing or hopper 1, toward the bottom and in the interior of which is journaled a rotary toothed cylinder 2 constituting the active ice-crushing element. As shown in Fig. 2, the toothed cylinder 2 is supported on a shaft 3, the ends of which are journaled in bosses 4 on the sides of the hopper 1. Secured to one end of the shaft 3 externally of the hopper is a hand wheel 5 of substantial size and weight, to the peripheral portion of which is attached a suitable handle 6.

The hopper casing 1 is formed in the present instance of four parts consisting respectively of two side plates, 7 and 8, in which are formed the bosses 4, and front and rear plates 9 and 10. The front and rear plates 9 and 10 are each provided at the inside with a series of bosses 11, which in assembly register and lie in abutment with the bosses 12 of a corresponding series formed at the inner sides of the side plates 7 and 8. These bosses are apertured, and the bosses 11 are tapped for reception of screws (not shown) which rigidly secure the elements together in the assembled relation as shown. Each of the front and rear plates 9 and 10 is also provided at its lower end with lugs 13, 13 at the opposite sides respectively, and these lugs project outwardly from the edges of the plates and overlap the adjoining sections of the side plates 7 and 8, see Fig. 2. Registering apertures in the said side plates and lugs 13 receive retaining screws, and the lug apertures are tapped for reception of the threaded inner ends of said screws. As shown in Figs. 1 and 2, the side plates 7 and 8 are extended downwardly below the lower edges of the front and rear plates 9 and 10, and these extensions form in effect legs 14, 14 at opposite sides which support the hopper 1 in an elevated position and provide a space below the hopper for reception of a suitable receptacle (not shown) which receives the crushed ice. The lower extremities of the legs 14 are provided at each end with a slot 15, see Fig. 3, adapted for reception of screws or bolts by which the casing may be secured to a table top or other supporting surface.

As shown in Figs. 2 and 3, the cylinder 2 is provided with a series of circumferential slots 16 in which are seated the shank ends of a series of teeth 17, the said shanks being curved to conform to the cylindrical contour of the bottoms of said slots, and the opposite ends of the said teeth projecting substantially tangentially from and beyond the peripheral surface of the cylinder and are provided at their outer ends with sharp points, as shown in Fig. 1. The teeth are rigidly secured to the cylinder by upsetting the adjoining sides and outer edges of the slots 16, so that the upset metal as shown in Figs. 2 and 3 extends over and in clamping relation to the shank portions of the teeth, as indicated at 18, and the sides of the groove at the immediate rear of each of the tooth shanks is also upset, as indicated at 19, to form a solid abutment for the rear ends of the teeth. The teeth 17 are arranged in staggered relation circumferentially of the cylinder 2 and are thereby uniformly distributed around the cylinder in spiral series.

Formed integrally with the front plate 9 is a fixed comb consisting of a plurality of inwardly projecting triangular flanges or teeth 21, these teeth being arranged in transverse relatively spaced series intermeshing with the teeth 17 of the cylinder 2. As shown in Fig. 1, the upper edges of the teeth 21 are inclined downwardly from the inner face of the front plate 9 toward the surface of the cylinder 2, the inner ends of the teeth lying in proximity to the cylinder. Since in operation the cylinder 2 is rotated in the direction of the arrow in Fig. 1, the teeth 17 pass upwardly between the teeth 21 of this fixed comb, and the comb is adapted to prevent the passage of the ice fed into the hopper between the cylinder 2 and the front wall 9 and to preclude the jamming of this ice between the cylinder and the wall, and also to direct the ice away from the wall and toward the cylinder so that the ice is brought by gravity into the path of the teeth 17.

The rear wall 10 of the hopper is provided at its inner surface with a plurality of inwardly projecting fins or flanges 22, 23 and 24. The flange 22 nearest the upper edge of the hopper is relatively long and, therefore, projects relatively far into the interior of the hopper, and the flanges 23 and 24 are progressively smaller. The primary function of these flanges is to constitute abutment stops for the ice on the rear wall of the casing, towards which the ice in the hopper is urged by action of the toothed cylinder 2, so that the ice under this action is not free to ride up along said rear wall, but is held solidly between the said flanges and the teeth so that the latter in their rotary movement may function efficiently to crush the ice. In this manner the larger particles of ice fed to the hopper are broken up into smaller portions, which then pass downwardly below the flanges 24 into the space between the rear wall 10 and the cylinder 2.

The ultimate size of the crushed ice discharged from the bottom of the hopper is determined, and may be regulated, by an adjustable comb 25 which is slidably secured against the inner face and at the lower part of the rear wall 10 of the hopper. This comb is shown in perspective in Fig. 4, wherein it will be noted that it comprises a vertical base plate 26, the flat rear face of which, in assembly, lies flush against the inner surface of the rear wall 10 of the hopper, and from the front face and lower edge of which projects a series of flanges or teeth 27. The teeth 27 are relatitvely wide at the bottoms and taper upwardly at the sides, and the teeth are also tapered from their base ends adjoining the base plate 26 toward their outer ends. By reason of this double tapered form, the spaces between the teeth are relatively large at their upper ends and narrow toward the bottom, and these spaces at the bottom are also relatively restricted toward the base plate 26 and expand towards the outer ends of the teeth. The upper edges of the teeth, as indicated at 28, slope downwardly away from the base plate 26, and towards the outer end of the teeth the angle of inclination is increased as indicated at 29. It will be noted also that the middle tooth 27a of the series is extended upwardly beyond the tops of the others of the teeth, and is thereby caused to function in effect as a spreader, directing the ice particles outwardly toward the opposite sides of the comb and preventing undue accumulation of ice at the center.

As shown in Figs. 2 and 3, the comb 25 fits between the side walls 7 and 8 and is held flatly against the rear wall 10 by means of a stud 30, the inner end of which is secured in the comb, as shown in Fig. 1, by means of a set screw 31 and which projects through a slot 32 in the wall 10 of the hopper. The outer threaded end of the stud 30 is provided with a nut 33, and a coiled spring 34 embracing the stud inwardly of the nut is confined between the inner countersunk face of the nut and a tapered sleeve 35, and exerts pressure forcing the sleeve resiliently against the outer face of the rear wall 10 of the hopper. A spring clip 36 detachably secured in an annular recess in the outer end of the stud functions to limit the outward movement of the nut 33 on the stud and to prevent the nut from being entirely freed from the stud. It is apparent, with this construction, that when the nut 33 is backed outwardly on the stud 30, the stud together with the comb 25 may be adjusted through the slot 32 to a plurality of differing vertical positions at the inner side of the rear wall 10 of the hopper, the extremes of this adjustment being determined by the length of the slot 32. In the present instance and as shown in Fig. 6, the outer side of the slot 32 is provided with three countersunk recesses 37, 38 and 39, these recesses being adapted to neatly receive the inner tapered end of the sleeve 35. By means of these recesses, therefore, three different positions of adjustment of the comb 25 are clearly defined, and the comb may readily be adjusted into any one of these three positions.

After the comb and the stud have been moved into the desired position of adjustment, the nut 33 is tightened on the stud, thereby forcing the sleeve 35 into one or other of the recesses 37, 38 and 39, and rigidly locking the comb in the desired position of adjustment. The spring 34, through the collar 35, however, acts continuously to hold the comb 25 flatly against the inner face of the wall 10. In order to preclude tilting or jamming of the comb 25 in the hopper, the latter is provided at its lower end with an extension 40 which fits slidably between a pair of spaced lugs 41, 41 extending from a boss 42 projecting from the wall 10. The upward movement of the comb 25 is limited in the present instance by engagement of the upper recessed corners, indicated at 43 in Fig. 4, with the bosses 11, see Fig. 1, on the inner side of the rear wall 10, and the downward movement of the comb 25 is limited by engagement of the lower edge thereof with a pair of bosses 44 projecting from the inner face of the hopper wall 10.

In the upper position of adjustment of the comb 25 wherein the tapered sleeve 35 occupies the recess 37, the comb is relatively close to the toothed cylinder 2, and as a consequence the ice will be chipped and crushed by the cooperative action of the teeth and comb into relatively small fragments. If ice of somewhat larger fragment size is desired, the comb 25 may be adjusted as previously described to an intermediate position wherein the sleeve 35 will occupy the recess 38. In this position the comb lies further from the toothed cylinder, and by reason of the greater interstitial space between the comb 25 and the surface of the cylinder and from the teeth, the fragments discharged at the bottom of the hopper will be larger in size. If still larger fragment size is desired, the comb may be adjusted to the lowermost position in which the tapered sleeve 35 occupies the recess 39, and in this case the relative remoteness of the comb from the toothed cylinder will permit fragments of ice of relatively great size to pass downwardly to the discharge. In any one position of the comb 25, however, the sizes of the fragments resulting from the operation of the machine will be relatively uniform.

Attention is directed to the method of mounting the adjustable comb 25 against the wall 10 of the hopper through the medium of the stud 30, the nut 33, the spring 34, and the tapered sleeve 35, and also the manner in which the stud is secured to the comb by means of the set screw 31. This assembly is an extremely simple one, facilitating both the manufacturing and assembling operations. At the same time it affords an extremely simple and readily manipulated adjustment for the comb 25, and has the necessary strength and durability to stand up in normal operation over an extended period of time.

We claim:

1. An ice crusher comprising a hopper, a rotary toothed element journaled in said hopper, a toothed comb operatively associated with said rotary element and coactive with the latter to reduce the ice to a required state of sub-division, means for mounting said comb against a wall of said hopper for sliding adjustment thereon between positions respectively relatively closely adjacent and remote to said rotary element to thereby regulate the ultimate sizes of the crushed particles, said means comprising a stud projecting from the comb through a slot in said wall and constituting a means for adjusting the comb from the exterior of the hopper, a clamping nut on the outer threaded end of said stud, a tapered sleeve loosely mounted on said stud inwardly of said nut, a spring confined between the nut and said sleeve and operative to urge the sleeve against the outer surface of said wall, said wall having a plurality of recesses at the outer side of said slot arranged in spaced series longitudinally of the latter and adapted for reception of the tapered end of said sleeve, said recesses defining a plurality of different positions of adjustment of said comb with respect to the rotary element, and said nut being adapted when turned inwardly on the stud to solidly clamp said sleeve against the wall of the hopper and in a selected one of said recesses.

2. An ice crusher comprising a hopper, a rotary element journaled in said hopper, said element carrying spaced projecting substantially tangential tines and extending axially between two opposite walls of the hopper and being spaced radially from a third of said walls, these tines when occupying a position at the top of said rotary element projecting in the direction of said third wall, the lower portion of said latter wall extending below the axial center line of said rotary element substantially in a plane tangential to an imaginary cylinder coaxial with said element, a comb element having spaced fingers projecting transversely into the interior of the hopper, said comb coacting with the rotary element to reduce the ice to a required state of sub-division, means for mounting said comb against the last-named wall of the hopper for sliding adjustment upwardly and downwardly on the inner surface of the said lower portion thereof below a point approximately where a line from the axis of the rotary element and normal to the surface of the wall intersects the latter, and between positions respectively relatively closely adjacent and remote to said rotary element to thereby regulate the ultimate sizes of the crushed particles, said mounting means comprising a stud projecting from the comb through a slot in said wall, releasable means on the outer end of said stud for solidly clamping the comb in adjusted position to the wall, and a spring mounted on said stud and operative when said clamping means is released to resiliently support the comb in normal position against the inner surface of said wall.

3. An ice crusher comprising a hopper, a rotary element journaled in said hopper, said element carrying spaced projecting substantially tangential tines and extending axially between two opposite walls of the hopper and being spaced radially from a third of said walls, said tines when occupying a position at the top of said rotary element projecting in the direction of said third wall, the lower portion of said latter wall extending below the axial center line of said rotary element substantially in a plane tangential to an imaginary cylinder coaxial with said element, a comb element mounted on said wall and having spaced fingers projecting transversely into the interior of the hopper, said comb coacting with the rotary element to reduce the ice to a required state of sub-division and being adapted for sliding adjustment upwardly and downwardly on the inner surface of the said lower portion of the wall below a point approximately where a line from the axis of the rotary element and normal to the surface of the wall intersects the latter, and between positions respectively relatively closely adjacent and remote to said rotary element to thereby regulate the ultimate sizes of the crushed particles, means comprising an element of said comb projecting through an opening in the hopper wall for adjusting the comb from the exterior of the hopper, and means on the outer end of said projecting element for normally supporting said comb in flat sliding engagement with the wall and for releasably solidly clamping said comb in adjusted position.

THOMAS J. FEGLEY.
GEORGE O. LEOPOLD.